United States Patent [19]
Stjarne et al.

[11] 4,049,088
[45] Sept. 20, 1977

[54] PARKING BRAKE ARRANGEMENT FOR A RAIL VEHICLE BRAKE

[75] Inventors: Anders Olov Gunnar Stjarne; Nils Borje Lennart Sander, both of Malmo, Sweden

[73] Assignee: Svenska Aktiebolaget Bromsregulator, Malmo, Sweden

[21] Appl. No.: 660,856

[22] Filed: Feb. 24, 1976

[30] Foreign Application Priority Data
Feb. 27, 1975 Sweden .................................. 7502201

[51] Int. Cl.$^2$ ............................................. F16D 65/30
[52] U.S. Cl. ..................................... 188/107; 188/170
[58] Field of Search ........................... 188/107, 170, 52

[56] References Cited
U.S. PATENT DOCUMENTS

| | | | |
|---|---|---|---|
| 2,531,055 | 11/1950 | Kirk | 188/107 |
| 3,750,852 | 8/1973 | Shoemaker | 188/107 |

*Primary Examiner*—Duane A. Reger
*Attorney, Agent, or Firm*—Laurence R. Brown

[57] ABSTRACT

A fluid pressure piston operated parking spring brake mechanism is coupled at the junction of a service brake actuator and slack adjuster by a pull rod linkage to apply brakes with the spring force. A disengagement mechanism permits return movement of the actuator when spring brake fluid pressure is vented.

1 Claim, 2 Drawing Figures

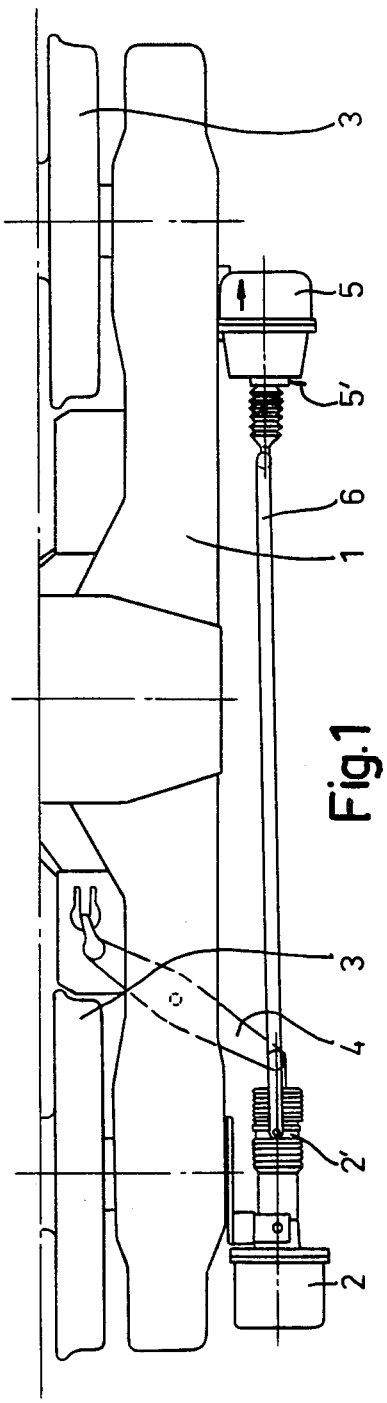
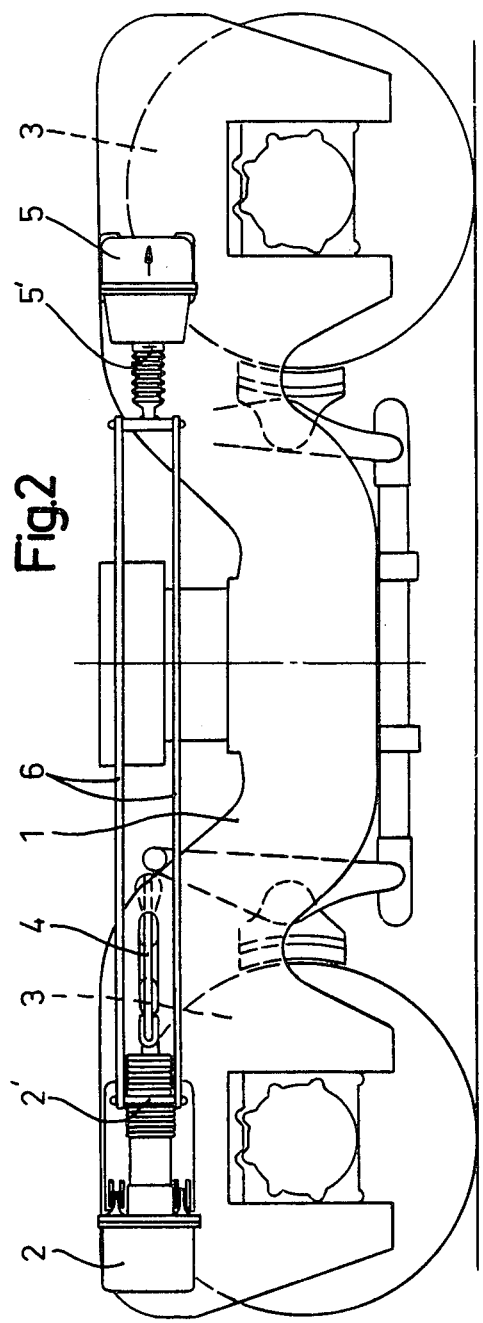

PARKING BRAKE ARRANGEMENT FOR A RAIL VEHICLE BRAKE

This invention relates to a parking brake arrangement for a rail vehicle brake, including a service brake actuator with built-in slack adjuster.

BACKGROUND OF THE INVENTION

Restrictions of different kinds may exclude all possible such arrangements hitherto known. The background to the invention is thus the desire to attain a parking brake arrangement of the kind defined above for a case where the space is very limited, especially in the vicinity of the service brake actuator, and when a parking brake application shall be obtained without any manual force. Another requirement is that it shall be possible to release the parking brake, ie to move the vehicle, without having to use any special tools or any manual force. The slack adjuster shall further be included in the force transmitting path at parking braking.

OBJECTIVES AND BRIEF DESCRIPTION

All these requirements are fulfilled in that a separate spring brake cylinder by means of a force transmitting means is connected to an actuator part situated before the slack adjuster in the actuator force transmitting path, the cylinder spring acting in the brake application direction of the actuator but, except at parking braking, being kept compressed by fluid pressure and a disengagement mechanism being provided in the arrangement for allowing a return movement for the actuator and the force transmitting means despite lack of fluid pressure in the cylinder.

In order to apply the brakes at parking it is thus only necessary to vent the spring brake cylinder to the atmosphere, so that the spring therein may expand and apply the brakes via the force transmitting means. At the return of the spring brake cylinder fluid pressure the spring will again be compressed, so that the spring brake cylinder will be ready for a new parking braking whether the disengagement mechanism has been used or not. This disengagement mechanism is preferably arranged in the spring brake cylinder and may be of any conventional type known to a person skilled in the art. The parking brake arrangement as a whole may be characterised as a spring brake with quick-release.

THE DRAWING

The invention will be described in further detail below reference being made to the accompanying drawing, in which FIG. 1 is a top view of part of a railway vehicle bogie and FIG. 2 is a side view of the same.

DETAILED DESCRIPTION

A railway vehicle bogie 1 is provided with a brake rigging actuated by a conventional fluid-controlled service brake actuator 2 with a built-in slack adjuster. This pushing actuator 2 is mounted on the bogie and is able to transmit a brake force to two wheels 3 in the bogie 1 via a conventional system of levers and rods, of which only a first lever 4 pivotally mounted in the bogie 1 is numbered in the drawing.

The actuator 2 is provided with a part 2' acting as a parking or hand brake connection. This part 2' is arranged before the slack adjuster in the force transmitting path of the actuator 2, i.e. between the piston and the slack adjuster. Further, it is arranged not to move at a service brake application under the action of fluid pressure.

A spring brake cylinder 5 is attached to the bogie 1 and is connected to the actuator part 2' by means of a force transmitting means 6, in the shown embodiment two pull rods. The powerful spring in the cylinder 5 is acting in the direction indicated by an arrow, i.e. in the brake applying direction. Normally the spring is compressed under the action of fluid pressure, which however is released at a parking braking, so that the spring may expand and apply the brakes via the part 2' as well as the slack adjuster of the actuator 2 and the lever 4.

In some cases it may be desirable to release the brakes in the absence of fluid pressure for the spring brake cylinder 5. For that reason the latter is provided with a disengagement mechanism, of which only a control means 5' is visible from the outside. The function is, however, such that by actuating this control means 5' it will be possible to disengage the spring of the cylinder 5 from the outgoing pull rod or with other words the force transmitting means 6, so that the brakes will be released under the action of the normal return spring means in the conventional brake rigging. The disengagement mechanism is further such that at the return of the fluid pressure for the spring cylinder 5 the parts therein will automatically return to their original force transmitting positions.

Means (not shown) are provided in the arrangement to prevent the outgoing pull rod of the spring brake cylinder 5 from rotating.

On the shown bogie mounting holes are provided at the positions where the service brake actuator 2 and the spring brake cylinder 5 now are mounted. Besides the fact that the space at the bogie is very limited, this is reason for the comparatively long distance between these two units.

On the opposite side of the bogie there may be a brake rigging including a service brake actuator but not necessarily a spring brake cylinder with its associated force transmitting means.

Many modifications are possible within the scope of the appended claims. It is especially to be noted that the force transmitting means 6 need not be pull rods but for example may be a chain or wire. Also, other relative positions of the units are possible as long as other requirements, for example regarding the available space, are fulfilled.

What is claimed is:

1. A parking brake arrangement for a rail vehicle brake, comprising in combination, a service brake actuator with a piston and built-in slack adjuster for providing a braking force along an actuator force transmission path to braking levers in said vehicle, a separate spring brake cylinder unit remotely located from said actuator with the spring brake spring acting in the brake application direction of said actuator, and a fluid pressure responsive piston keeping the spring compressed in the presence of fluid pressure, a force transmitting pull rod linkage coupling the spring brake cylinder between the service brake piston and the slack adjuster, and a disengagement mechanism built into said spring brake unit with an externally extending control lever for permitting a return movement of the actuator and linkage in the absence of fluid pressure in said spring brake piston.

* * * * *